(12) United States Patent
Berry et al.

(10) Patent No.: US 8,381,532 B2
(45) Date of Patent: Feb. 26, 2013

(54) BLED DIFFUSER FED SECONDARY COMBUSTION SYSTEM FOR GAS TURBINES

(75) Inventors: Jonathan Dwight Berry, Simpsonville, SC (US); Michael John Hughes, Greer, SC (US)

(73) Assignee: General Electric Company, Schenectady, NY (US)

( * ) Notice: Subject to any disclaimer, the term of this patent is extended or adjusted under 35 U.S.C. 154(b) by 428 days.

(21) Appl. No.: 12/694,544

(22) Filed: Jan. 27, 2010

(65) Prior Publication Data

US 2011/0179803 A1 Jul. 28, 2011

(51) Int. Cl.
*F02C 9/00* (2006.01)
*F02C 1/00* (2006.01)

(52) U.S. Cl. ............................... 60/795; 60/751

(58) Field of Classification Search ............ 60/782, 60/785, 795, 751, 39.23, 39.27, 737, 722, 60/39.17
See application file for complete search history.

(56) References Cited

U.S. PATENT DOCUMENTS

| | | | |
|---|---|---|---|
| 4,288,980 A * | 9/1981 | Ernst | ............ 60/39.23 |
| 4,308,718 A | 1/1982 | Mowill | |
| 4,431,374 A | 2/1984 | Benstein et al. | |
| 4,446,692 A | 5/1984 | Adkins | |
| 4,796,429 A | 1/1989 | Verdouw | |
| 5,839,283 A | 11/1998 | Döbbeling | |
| 6,047,550 A | 4/2000 | Beebe | |
| 6,192,688 B1 | 2/2001 | Beebe | |
| 6,334,297 B1 | 1/2002 | Dailey et al. | |
| 6,868,676 B1 | 3/2005 | Haynes | |
| 6,931,854 B2 | 8/2005 | Saitoh et al. | |
| 2007/0068165 A1* | 3/2007 | Tiemann | ............ 60/751 |

OTHER PUBLICATIONS

U.S. Appl. No. 12/508,918, filed Jul. 24, 2009.
Lefebvre, Arthur, *Gas Turbine Combustion*, pp. 71-99, Taylor & Francis Publications 1999.

* cited by examiner

*Primary Examiner* — Gerald Sung
(74) *Attorney, Agent, or Firm* — Dority & Manning, P.A.

(57) ABSTRACT

The present subject matter provides a system for modifying static pressure recoveries and emissions formation within a gas turbine. The system includes a bled diffuser positioned downstream from a compressor section of the gas turbine and a bleed duct extending from the bled diffuser. The bleed duct may be configured to direct bleed air from the pressurized airflow exiting the compressor section to a secondary combustion system located downstream from the main combustion system in a combustor. The bleed air flowing into the secondary combustion system may be mixed with fuel to form an air/fuel mixture.

20 Claims, 6 Drawing Sheets

BLED DIFFUSER FED SECONDARY COMBUSTION SYSTEM FOR GAS TURBINES

FIELD OF THE INVENTION

The present subject matter relates generally to gas turbines and particularly to improving the efficiency of a gas turbine. More particularly, the present subject matter relates to a system and method for feeding bleed air from a bled diffuser to a secondary combustion system in a combustor to improve the overall efficiency of a gas turbine.

BACKGROUND OF THE INVENTION

In order to improve the efficiency of the combustion of fuel and air within a combustor, gas turbines typically include a diffuser designed to reduce the velocity and increase the static pressure of the pressurized airflow exiting the compressor section of the gas turbine. A diffuser may generally comprise at least one diverging diffuser wall, which allows the pressurized airflow to spread or diffuse over the length of the diffuser. However, as the pressurized airflow flows through the diffuser, friction along the diffuser wall(s) creates a boundary layer, wherein the velocity of the airflow is significantly lower than the velocity of the main airflow. Thus, the formation of a boundary layer may result in an airflow entering the combustor section of a gas turbine that exhibits a non-uniform velocity profile. This can negatively impact combustion within the combustors and reduce the overall efficiency of a gas turbine. Moreover, significant flow losses may result when the boundary layer separates from the diffuser wall, which can occur when the angle of divergence of the diffuser wall(s) is too wide. Accordingly, diffusers must typically be relatively long to obtain the necessary static pressure recovery without causing boundary layer separation.

To overcome these issues, bled diffusers are known that bleed air flowing adjacent to the diffuser wall(s) from the main airflow. In particular, a bled diffuser may be used to reduce the boundary layer size by bleeding all or a portion of the boundary layer away from the main airflow. This can reduce the likelihood of flow losses due to boundary layer separation and also produces a shorter diffuser that can accommodate wide angles of divergence to allow a significant increase in the static pressure recovery downstream from the compressor section. Consequently, however, the improved performance of a bled diffuser is often offset by the reduction in overall efficiency and performance of the gas turbine caused by bleeding pressurized air from the main airflow. Specifically, bleeding potions of the air exiting the compressor section reduces the amount of compressed air available to cool turbine components or to increase the turbine inlet pressure.

Accordingly, a system within a gas turbine that offers the benefits of a bled diffuser without the loss of efficiency and performance caused by bleeding pressurized air from the main airflow would be welcome in the technology.

BRIEF DESCRIPTION OF THE INVENTION

Aspects and advantages of the present subject matter will be set forth in part in the following description, or may be obvious from the description, or may be learned through practice of the present subject matter.

In one aspect, the present subject matter provides a system for modifying the static pressure recovery and emissions formation within a gas turbine. The system includes a bled diffuser positioned downstream from a compressor section of the gas turbine and a bleed duct extending from the bled diffuser. The bleed duct may be configured to direct bleed air from the pressurized airflow exiting the compressor section to a secondary combustion system located downstream from the main combustion system in a combustor. The bleed air flowing into the secondary combustion system may be mixed with fuel to form an air/fuel mixture.

In another aspect, the present subject matter provides a gas turbine that includes a compressor section configured to pressurize an airflow and a combustor section disposed downstream of the compressor section. The combustor section includes at least one combustor configured to mix and combust an air/fuel mixture. A turbine section is disposed downstream of the combustor section and is configured to receive hot products of combustion flowing from the combustor section. The gas turbine also includes the system described above and discussed and illustrated herein in greater detail.

These and other features, aspects and advantages of the present subject matter will become better understood with reference to the following description and appended claims. The accompanying drawings, which are incorporated in and constitute a part of this specification, illustrate embodiments of the present subject matter and, together with the description, serve to explain the principles of the present subject matter.

BRIEF DESCRIPTION OF THE DRAWING

A full and enabling disclosure of the present subject matter, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the present subject matter, one or more examples of which are illustrated in the drawings. Each example is provided by way of explanation and not limitation of the present subject matter. In fact, it will be apparent to those skilled in the art that various modifications and variations can be made in the present subject matter without departing from the scope or spirit of the present subject matter. For instance, features illustrated or described as part of one embodiment, can be used with another embodiment to yield a still further embodiment. Thus, it is intended that the present subject matter covers such modifications and variations as come within the scope of the appended claims and their equivalents.

Figure 1:
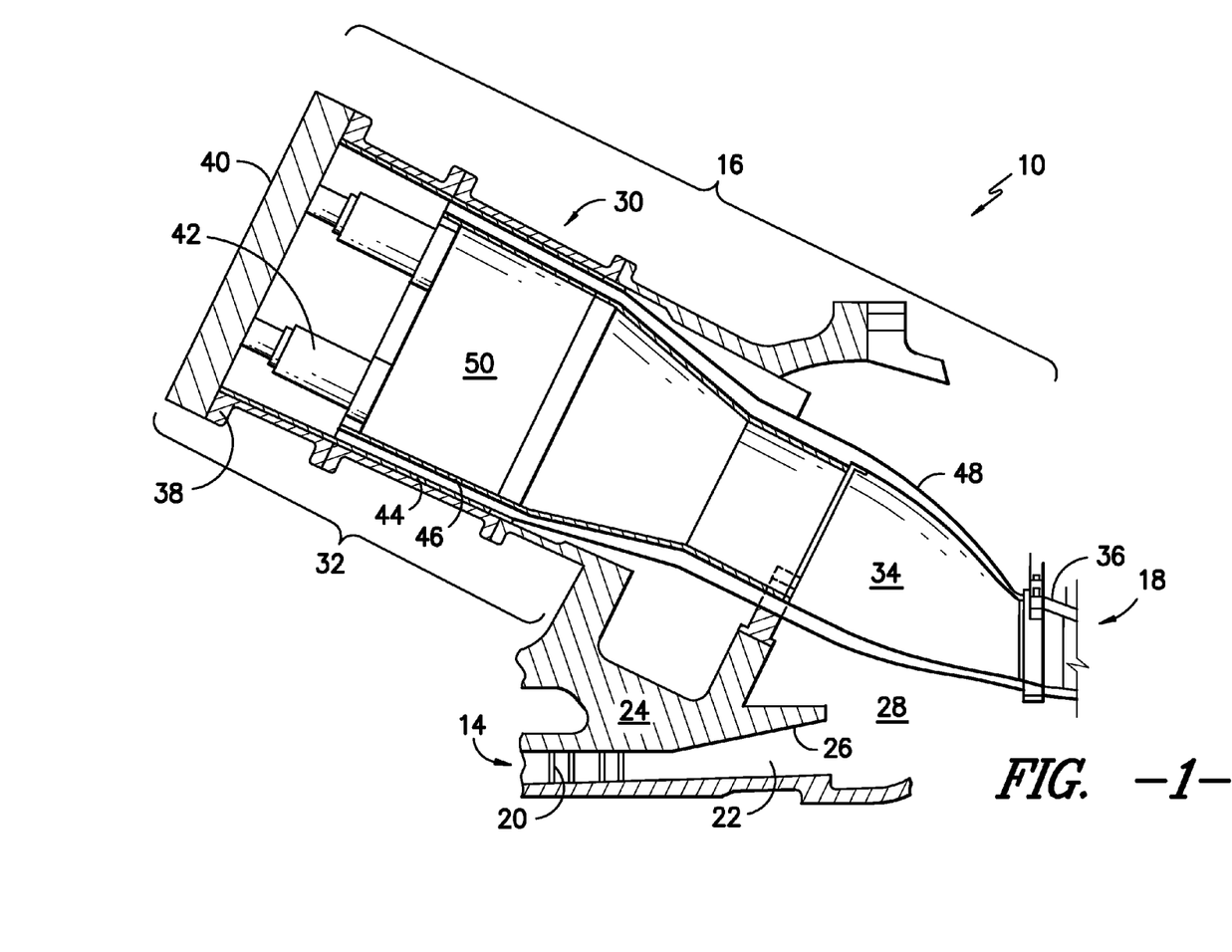
FIG. 1 illustrates a cross sectional view of a portion of a gas turbine.

Referring to FIG. 1, a simplified drawing of a portion of a gas turbine 10 is illustrated. The gas turbine 10 comprises a compressor section 14 configured to pressurize air flowing into the turbine 10. Pressurized air discharged from the compressor section 14 flows into the combustor section 16, wherein the air is mixed with fuel and combusted. Hot gases of combustion flow from the combustor section 16 to a turbine section 18 to drive the gas turbine 10 and generate power.

The compressor section 14 is generally represented by a series of vanes and blades 20 used to compress air flowing into the gas turbine 10. The pressurized airflow exiting the compressor section 14 may flow through a diffuser 22, defined by the compressor discharge casing 24, prior to entering the combustor section 16. The diffuser 22 may generally include at least one diverging diffuser wall 26, which forms an increasing cross-sectional flowpath for the airflow. As the cross-sectional area of the flowpath increases, the airflow spreads thereby decreasing the velocity and increasing the static pressure of the airflow. The diffused airflow exiting the diffuser 22 then flows through an annular plenum 28 to the combustor section 16, which is generally characterized by a plurality of combustors 30 disposed around an annular array about the axis of the engine (only one of which is illustrated in FIG. 1).

Still referring to FIG. 1, each combustor 30 in a gas turbine 10 may include a main combustion system 32 for mixing and combusting an air/fuel mixture and a transition piece 34 for flowing hot gases of combustion to a stage one nozzle 36 of the turbine section 18. The main combustion system 32 may comprise a combustion casing 38, an end cover 40, a plurality of premixed fuel nozzle assemblies 42, a flow sleeve 44, and a combustion liner 46 disposed within the flow sleeve 44. During operation, diffused air exiting the diffuser 22 flows through the annular plenum 28 and enters each combustor 30 through the flow sleeve 44 and the impingent sleeve 48 of the transition piece 34, where it is swirled and mixed with fuel injected into each fuel nozzle assembly 42. The air/fuel mixture exiting each fuel nozzle assembly 42 flows into a reaction zone 50, defined by the combustor liner 46, where it is combusted. The hot gases of combustion then flow through the transition piece 34 to the turbine section 18 to drive the turbine 10 and generate electricity. It should be appreciated, however, that the main combustion system 32 need not be configured as described above and illustrated herein and may generally have any configuration that permits a combustible mixture to be mixed and combusted. Further, it should be appreciated that the main combustion system 32 may comprise additional components not described or illustrated herein.

Figure 2:
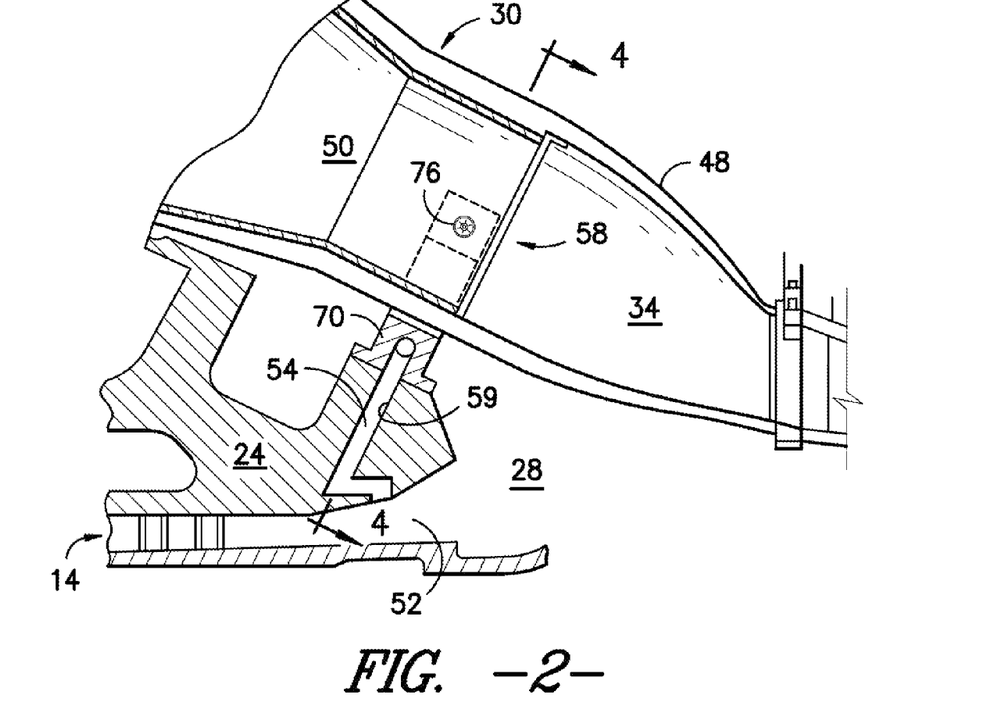
FIG. 2 illustrates a cross sectional view of one embodiment of a system for increasing static pressure recovery and reducing emission within a gas turbine in accordance with aspects of the present subject matter.

In accordance with an aspect of the present subject matter, FIG. 2 illustrates one embodiment of a system for modifying the efficiency of a gas turbine 10, such as by increasing the static pressure recovery and by reducing the formation of air polluting emissions. The system includes a bled diffuser 52 positioned downstream from the compressor section 14 and a bleed duct 54 extending from the bled diffuser 52. The bleed duct 54 may be configured to direct bleed air 56 (FIGS. 3, 4, 5 and 7) from the pressurized airflow exiting the compressor section 14 to a secondary combustion system 58 located downstream from the main combustion system 32 (FIG. 1). The bleed air 56 flowing into the secondary combustion system 58 may be mixed with fuel to form an air/fuel mixture and combusted within a reaction zone 50 of the combustor 30.

The bled diffuser 52 of the present subject matter may be generally configured to diffuse the pressurized airflow flowing from the compressor section 14. Specifically, the bled diffuser 52 may be configured to decrease the velocity of the airflow and, thereby, increase the static pressure of the airflow flowing through the annular plenum 28. In one embodiment, the bled diffuser 52 comprises a vortex controlled diffuser (VCD) defined by the compressor discharge casing 24. However, it should be appreciated that the bled diffuser 52 need not be a VCD but may generally comprise any type of bled diffuser generally known to those of ordinary skill in the art. Additionally, it should be appreciated that the VCD utilized with the present subject matter need not be configured as described below and illustrated herein, but may generally have any configuration or arrangement.

It has been found that a VCD may be employed in a gas turbine 10 to yield significantly high static pressure recoveries in a relatively short length. This increased pressure recovery provides an increased pressure differential between the air flowing through the annular plenum 28 and the hot gases of combustion flowing within the combustor 30. As this pressure differential increases, the efficiency and performance of a gas turbine 10 may be significantly improved. Specifically, an increased pressure differential can minimize the impact of using a portion of the airflow to cool turbine components and also increase turbine inlet pressure. Moreover, the use of a VCD can reduce the costs associated with manufacturing a gas turbine 10 by reducing the length of the rotor.

Figure 3:
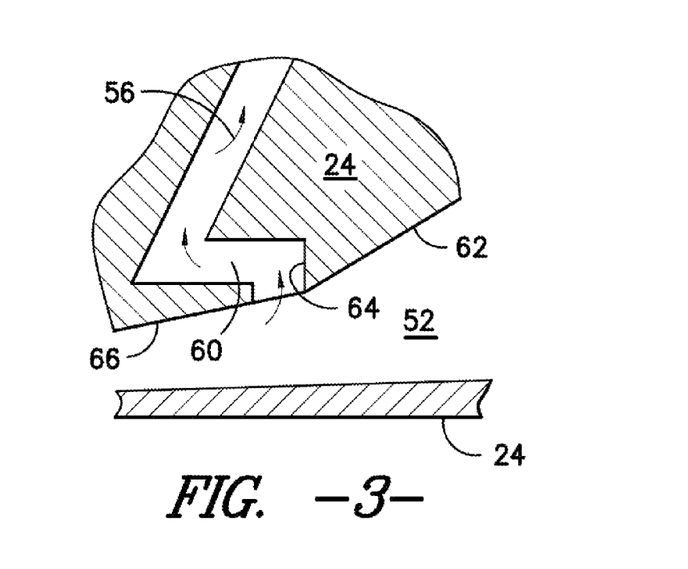
FIG. 3 illustrates a blown up view of an embodiment of a bled diffuser in accordance with aspects of the present subject matter.

Referring to FIG. 3, a blown up view of one embodiment of the bled diffuser 52 is illustrated. As shown, the bled diffuser 52 comprises a hybrid VCD that includes a vortex chamber 60 and a wide-angled post-diffuser 62, both defined by the compressor discharge casing 24. The vortex chamber 60 may include a vortex fence 64 defining one wall of the vortex chamber 60. It should be appreciated, however, that a VCD may include more than one vortex chamber 60. For example, a second vortex chamber (not illustrated) may be formed in the compressor discharge casing 24 opposite the location of the vortex chamber 60 or upstream of the vortex chamber 60. Moreover, the bled diffuser 52 may also comprise a prediffuser 66 in order to increase the static pressure of the airflow upstream of the vortex chamber 60.

During operation of the illustrated embodiment, the boundary layer formed as the pressurized airflow flows through the prediffuser 66 may be drawn from the main airflow by the arrangement of the vortex fence 64 in the vortex chamber 60. This produces a flow vortex within the vortex chamber 60 and creates a turbulent shear layer downstream of the chamber 60 to inhibit boundary layer separation in the wide-angled post diffuser 62. The portion of the airflow drawn from the main airflow may then be bled, as bleed air 56, from the vortex chamber 60 to cool various components of the gas turbine 10 or for use in a secondary combustion system 58, as will be described in greater detail below.

Figure 4:
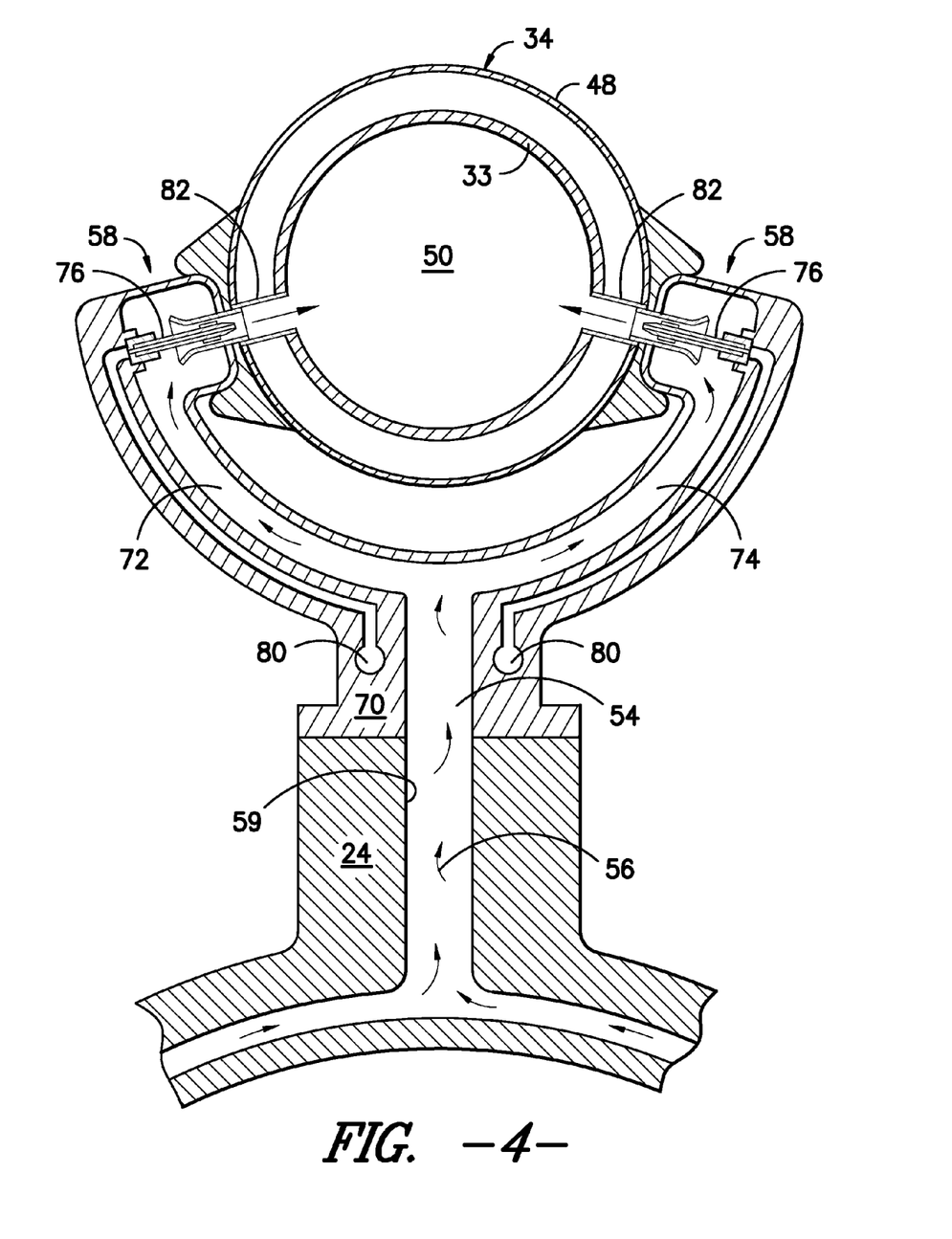
FIG. 4 illustrates a sectional view of FIG. 2, particularly illustrating embodiments of a bleed duct, a bracket, and a secondary combustion system in accordance with aspects of the present subject matter.

Referring to FIGS. 2 and 4, a bleed duct 54 extends from the bled diffuser 52 to a secondary combustion system 58 and may be configured to direct bleed air 56 to the secondary combustion system 58. Thus, in the illustrated embodiment, air drawn into the vortex chamber 60 may be bled from the main airflow through the bleed duct 54. As shown, a lower portion of the bleed duct 54 may be defined by a passageway 59 formed in the compressor discharge casing 24 and an upper potion of the bleed duct 54 may be defined by a bracket 70 mounted to the compressor discharge casing 24. It should be appreciated that the bracket 70 may be mounted to the compressor discharge casing 24 by any suitable means. Additionally, seals (not illustrated) may be included between the compressor discharge casing 24 and the bracket 70 so as to sufficiently seal the flow of bleed air 56 through the bleed duct 54. The bracket 70 may also be configured to mount to and support the transition piece 34. For example, as shown in FIG. 4, the bracket 70 may be mounted to the impingement sleeve 48 of the transition piece 34. One of ordinary skill in the art should appreciate that generally the bracket 70 may be secured to the transition piece 34 by suitable any means. It should also be appreciated that any mounting or securing means used to secure the bracket 70 to the transition piece 34 may be configured to accommodate thermal expansion of the transition piece 34. Further, seals (not illustrated) may also be included at the interface of the bracket 70 and the transition piece 34 to seal the flow of bleed air 56.

In the illustrated embodiment, the bracket 70 may also be hollow so as to form at least one flowpath for the bleed air 56 flowing through the bleed duct 54. As illustrated in FIG. 4, the bracket 70 may be y-shaped and include a first flow path 72 and a second flow path 74 that defines an upper portion of the bleed duct 54. Additionally, it should be appreciated that the bleed duct 54 may also include a valve (not illustrated) or generally any other means for shutting off the supply of bleed air 56 flowing through the bleed duct 54 to the secondary combustion system 58.

Figure 5:
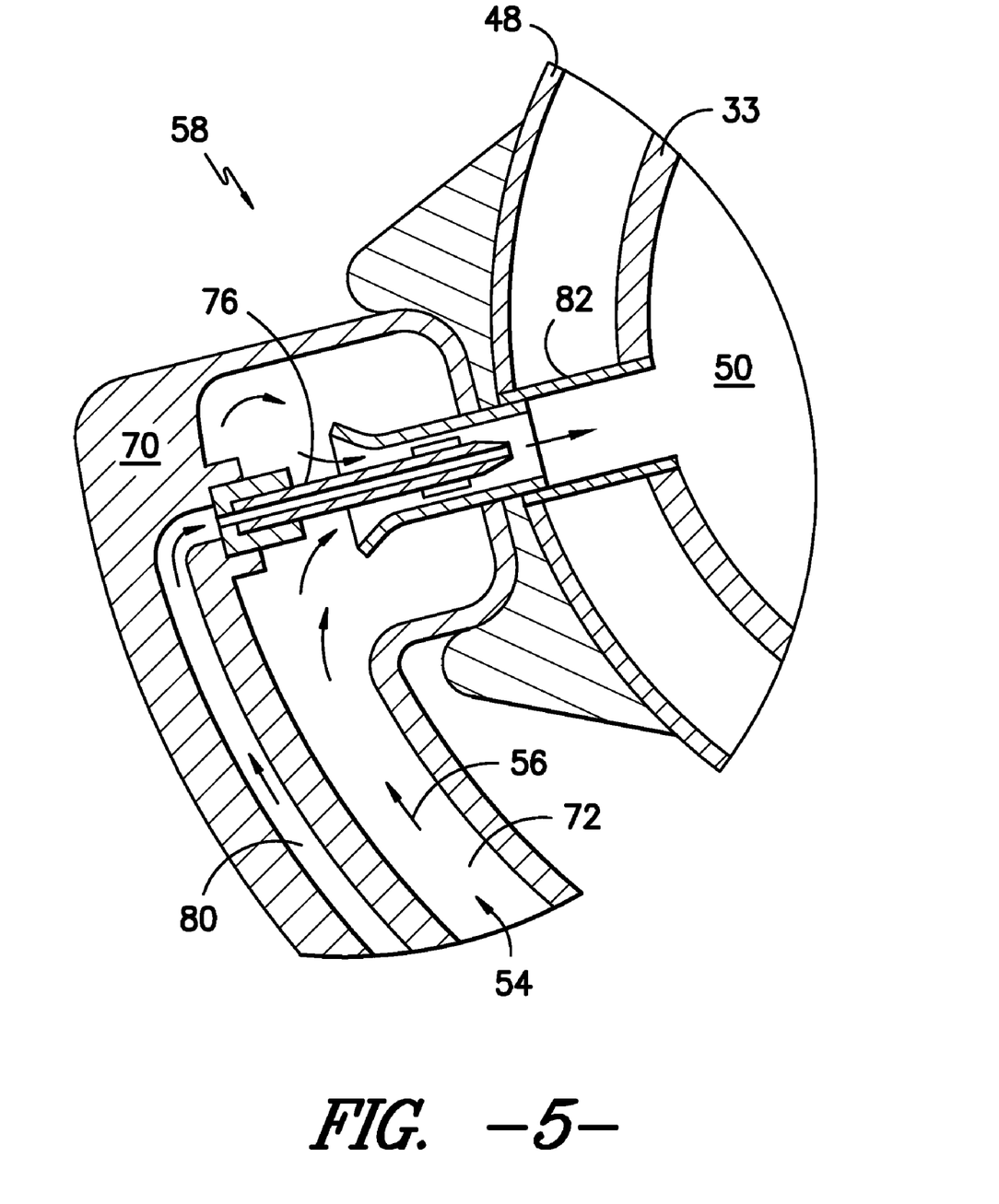
FIG. 5 illustrates a blown up view of a portion of FIG. 4, particularly illustrating one embodiment of a fuel injector of a secondary combustion system in accordance with aspects of the present subject matter.
Figure 7:
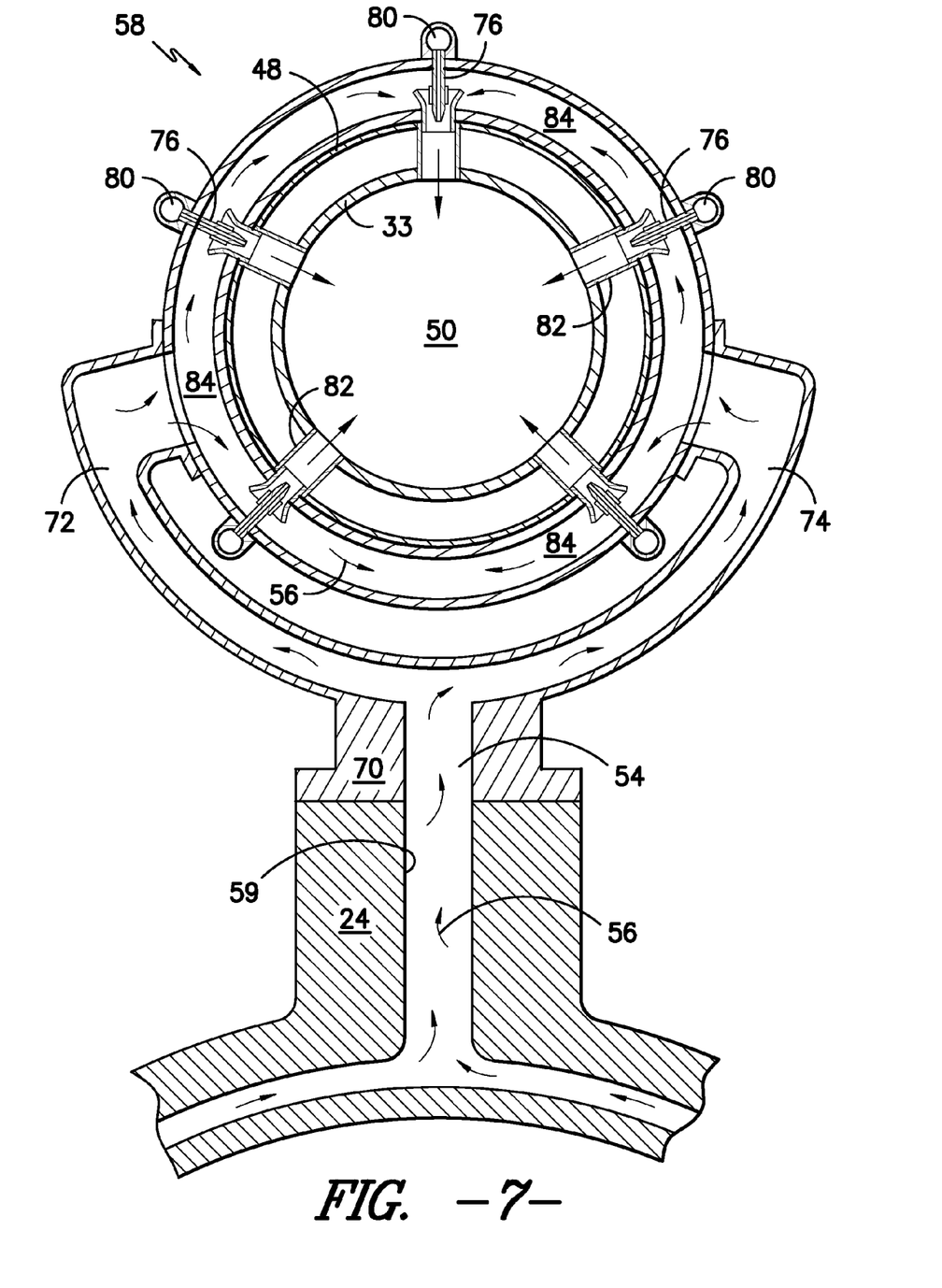
FIG. 7 illustrates a sectional view of FIG. 6, particularly illustrating embodiments of a bleed duct, a bracket, and a secondary combustion system in accordance with aspects of the present subject matter.

As indicated above, the bleed duct 54 may be configured to direct bleed air 56 to a secondary combustion system 58 located downstream from the main combustion system 32 (FIG. 1) in a combustor 30. The secondary combustion system 58 may generally include, for example, at least one fuel injector 76 configured to receive and discharge fuel from a fuel source 80 (FIGS. 4, 5 and 7). Additionally, it should be appreciated that the secondary combustion system 58 may include further components and may generally have any arrangement or configuration. For instance, the secondary combustion system 58 may comprise a late lean injection assembly or a lean direct injection assembly. Preferably, the secondary combustion system 58 may be configured such that fuel or an air/fuel mixture may be introduced into a reaction zone 50 of the combustor 30 and ignited by the hot gases of combustion flowing from the main combustion system 32 (FIG. 1). Thus, the secondary combustion system 58 can allow for higher firing temperatures within a combustor 30 while maintaining the formation rate of harmful emissions, such as NOx, at a minimum. This may be achieved by discharging a lean air/fuel mixture from the secondary combustion system 58 to ensure that the combustion reaction temperatures remain below the stoichiometric flame temperature. Additionally, low residence times within the transition piece 34 may keep thermal NOx formation rates low.

One embodiment of the secondary combustion system 58 is illustrated in FIGS. 2, 4 and 5. Referring to FIG. 4, the secondary combustion system 58 may include a pair of fuel injectors 76. For example, a first fuel injector 76 may be disposed in the first flow path 72 of the bracket 70 and a second fuel injector 76 may be disposed in the second flow path 74 of the bracket 70, with the combination of the flow paths 72, 74 defining a portion of the bleed duct 54. Additionally, the fuel injectors 76 may be in communication with a fuel source 80 such that the injectors 76 can receive and discharge fuel from the fuel source 80. As particularly shown in FIG. 5, the fuel injectors 76 may be mounted within the bracket 70 as a separate component. However, it should be appreciated that the fuel injectors 76 may be formed as integral part of the bracket 70. It should also be appreciated that the illustrated fuel injectors 76 have been simplified for illustrative purposes. Accordingly, fuel injectors 76 may be utilized in the system of the present subject matter that comprise additional components and that have varying configurations. For example, the fuel injectors 76 may include swirler vanes to impart rotation to the bleed air 56 flowing past the injectors 76.

During operation of a gas turbine 10 in accordance with one embodiment of the present subject matter, the secondary combustion system 58 is fed with bleed air 56 flowing through the bleed duct 54. It should be appreciated that the pressure differential between the bleed air 56 supplied through the bleed duct 54 and the combustion products flowing through the combustor 30 drives the bleed air 56 through the secondary combustion system and into the reaction zone 50 of the combustor 30. As the bleed air 56 flows past the fuel injectors 76, it is mixed with the fuel discharged by the injectors 76. The air/fuel mixture then flows through cross-over tubes 82, each defining a channel for the air/fuel mixture to pass through the impingement sleeve 48 and transition piece wall 33, and is ignited in a reaction zone 50 by the combustion products flowing from the main combustion system 32.

Figure 6:
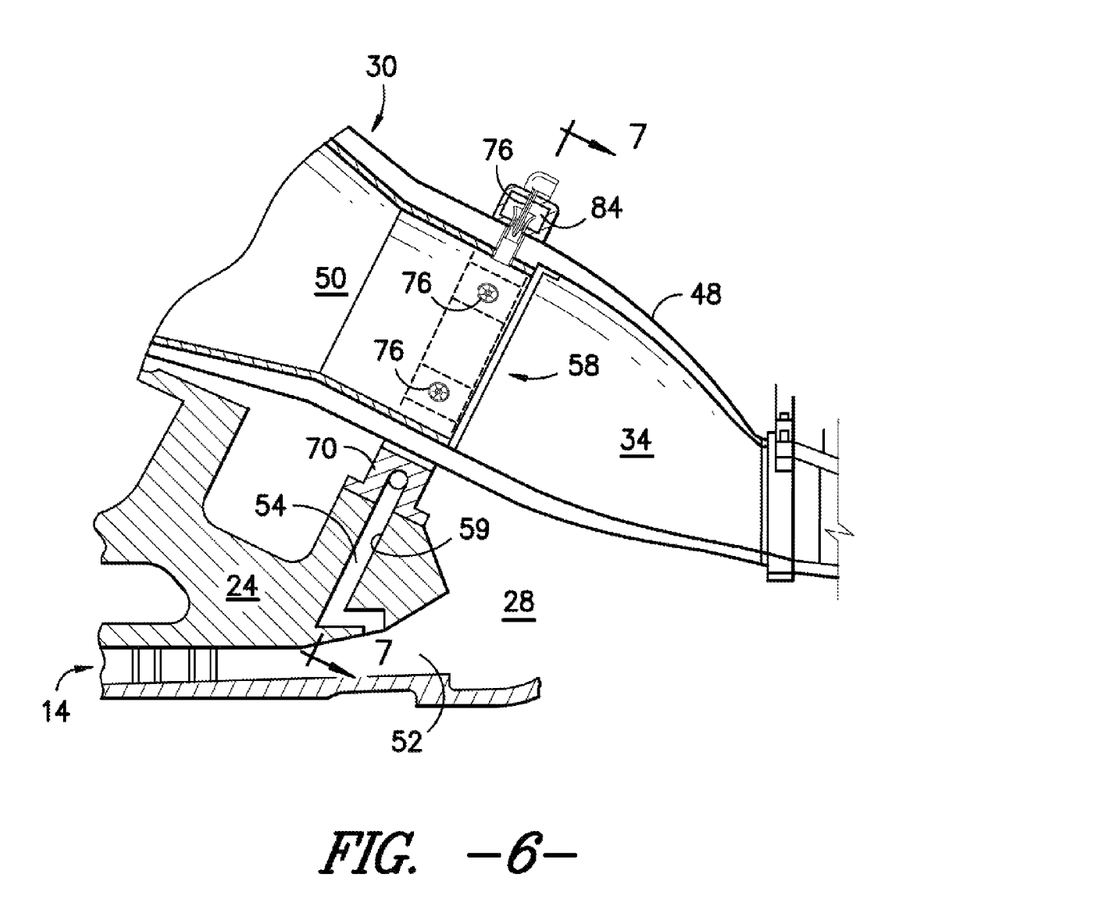
FIG. 6 illustrates a cross sectional view of another embodiment of a system for increasing static pressure recovery and reducing emission within a gas turbine in accordance with aspects of the present subject matter.

An alternative embodiment of the secondary combustion system 58 is depicted in FIGS. 6 and 7. The secondary combustion system 58 includes an air manifold 84 disposed between the bracket 70 and the impingement sleeve 48 of the transition piece 34. The air manifold 84 may be configured to receive bleed air 56 flowing from the bleed duct 54. In particular, the air manifold 84 may be configured to receive the bleed air 56 flowing from the first and second flow paths 72, 74 of the bracket 70, both of which define a portion of the bleed duct 54.

Additionally, the secondary combustion system 58 may include a plurality of fuel injectors 76 spaced apart within the air manifold 84. As shown in FIG. 7, the secondary combustion system 58 includes five spaced apart fuel injectors 76 mounted within the ring-shaped air manifold 84, with each fuel injector 76 being configured to receive and discharge fuel from a fuel source 80. However, it should be appreciated that any number of fuel injectors 76 may be disposed within the air manifold 84. It should also be appreciated that the fuel injectors 76 may be formed as an integral part of the air manifold 84 or may be mounted within the air manifold 84 as a separate component. Further, it should be appreciated that the air manifold 84 need not be ring-shaped, but may generally have any suitable shape. For example, the air manifold 84 may be semi-circular.

The operation of the secondary combustion system 58 illustrated in FIGS. 6 and 7 is similar to the embodiment described above. Particularly, bleed air 56 flowing through the bleed duct 54 enters the air manifold 84, where it is mixed with fuel discharged from each of the fuel injectors 76. The air/fuel mixture then flows through the cross-over tubes 82 and is ignited in a reaction zone 50 by the combustion products flowing from the main combustion system 32 (FIG. 1).

It should also be appreciated that the present subject matter also provides a gas turbine with increased static pressure recovery and reduce emissions. The gas turbine 10 may include a compressor section 14 configured to pressurize an airflow entering the gas turbine 10 and a combustor section 16 disposed downstream of the compressor section 14. The combustor section 16 may include at least one combustor 30 configured to receive the pressurized airflow discharged from the compressor section 14. Additionally, the combustor 30 may include a main combustion system 32 configured to mix and combust an air/fuel mixture. A turbine section 18 may be disposed downstream of the combustor section 16 and may be configured to receive hot products of combustion flowing from the combustor section 16. The gas turbine may also include the system of the present subject matter as discussed and illustrated herein.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for modifying static pressure recovery and emissions formation within a gas turbine, the system comprising:
a bled diffuser positioned downstream from a compressor section of the gas turbine, said bled diffuser configured to diffuse a pressurized airflow flowing from said compressor section;
a secondary combustion system located downstream from a main combustion system in a combustor, said secondary combustion system comprising at least one fuel injector configured to receive and discharge fuel from a fuel source, said at least one fuel injector being disposed downstream of a fuel nozzle assembly of said main combustion system;
a bleed duct extending from said bled diffuser to said secondary combustion system, said bleed duct configured to direct bleed air from said pressurized airflow to said secondary combustion system; and
wherein said bleed air flowing into said secondary combustion system is mixed with the fuel discharged from said at least one fuel injector to form an air/fuel mixture wherein said air/fuel mixture flows through a channel and into said secondary combustion system.

2. The system of claim 1, wherein said bled diffuser is defined by a compressor discharge casing of said gas turbine.

3. The system of claim 1, wherein said bled diffuser comprises a vortex-controlled diffuser, said vortex-controlled diffuser comprising at least one vortex chamber configured to draw said bleed air from said pressurized airflow.

4. The system of claim 1, wherein said bleed duct is partially defined by a passageway formed in a compressor discharge casing of said gas turbine.

5. The system of claim 1, comprising a bracket configured to support a transition piece of said combustor, wherein said bleed duct is partially defined by at least one flowpath formed by said bracket.

6. The system of claim 5, wherein said at least one fuel injector is disposed within said at least one flowpath of said bracket.

7. The system of claim 5, comprising a first flow path and a second flow path formed within said bracket, wherein said secondary combustion system comprises a first fuel injector and a second fuel injector, said first fuel injector disposed within said first flow path, said second fuel injector disposed within said second flow path.

8. The system of claim 5, wherein said secondary combustion system comprises an air manifold disposed between said bracket and said transition piece, wherein said air manifold is configured to receive said bleed air from said bleed duct.

9. The system of claim 8, wherein said secondary combustion system comprises a plurality of fuel injectors, said plurality of fuel injectors being disposed within said air manifold.

10. The system of claim 1, wherein said air/fuel mixture flows through a cross-over tube and into a reaction zone of said combustor.

11. A gas turbine with modified static pressure recovery and emissions formation, the gas turbine comprising:
a compressor section configured to pressurize an airflow entering the gas turbine;
a combustor section comprising at least one combustor configured to receive said airflow flowing from said compressor section, said at least one combustor comprising a main combustion system for mixing and combusting a first air/fuel mixture;
a turbine section disposed downstream of said combustor section, said turbine section configured to receive hot products of combustion from said combustor section;
at least one bled diffuser positioned downstream from said compressor section, said at least one bled diffuser configured to diffuse said airflow flowing from said compressor section;
a secondary combustion system located downstream from said main combustion system in said at least one combustor, said secondary combustion system comprising at least one fuel injector configured to receive and discharge fuel from a fuel source, said at least one fuel injector being disposed downstream of a fuel nozzle assembly of said main combustion system;
a bleed duct extending from said at least one bled diffuser to said secondary combustion system, said bleed duct configured to direct bleed air from said airflow to said secondary combustion system; and
wherein said bleed air flowing into said secondary combustion system is mixed with the fuel discharged from said at least one fuel injector to form a second air/fuel mixture wherein said second air/fuel mixture flows through a channel and into said secondary combustion system.

12. The gas turbine of claim 11, wherein said at least one bled diffuser is defined by a compressor discharge casing of said gas turbine.

13. The gas turbine of claim 11, wherein said at least one bled diffuser comprises a vortex-controlled diffuser, said vortex-controlled diffuser comprising at least one vortex chamber configured to draw said bleed air from said airflow.

14. The gas turbine of claim 11, wherein said bleed duct is partially defined by a passageway formed in a compressor discharge casing of said gas turbine.

15. The gas turbine of claim 11, comprising a bracket configured to support a transition piece of said at least one combustor, wherein said bleed duct is partially defined by at least one flowpath formed within said bracket.

16. The gas turbine of claim 15, wherein said at least one fuel injector is disposed within said at least one flowpath of said bracket.

17. The gas turbine of claim 15, comprising a first flow path and a second flow path formed within said bracket, wherein said secondary combustion system comprises a first fuel injector and a second fuel injector, said first fuel injector disposed within said first flow path, said second fuel injector disposed within said second flow path.

18. The gas turbine of claim 15, wherein said secondary combustion system comprises an air manifold disposed between said bracket and said transition piece, wherein said air manifold is configured to receive said bleed air from said bleed duct.

19. The gas turbine of claim 18, wherein said secondary combustion system comprises a plurality of fuel injectors, said plurality of fuel injectors being disposed within said air manifold.

20. The gas turbine of claim 11, wherein said second air/fuel mixture flows through a cross-over tube and into a reaction zone of said at least one combustor.

* * * * *